SEMI-CONDUCTOR DEVICE

Filed April 23, 1956 2 Sheets-Sheet 1

INVENTOR
FREDERIK HENDRIK STIELTJES
LEONARD JOHAN TUMMERS
BY [signature]
AGENT

INVENTOR
FREDERIK HENDRIK STIELTJES
LEONARD JOHAN TUMMERS
BY [signature]
AGENT

United States Patent Office 2,822,310

Patented Feb. 4, 1958

2,822,310

SEMI-CONDUCTOR DEVICE

Frederik Hendrik Stieltjes and Leonard Johan Tummers, Eindhoven, Netherlands, assignors, by mesne assignments, to North American Philips Company, Inc., New York, N. Y., a corporation of Delaware Application April 23, 1956, Serial No. 580,021

Claims priority, application Netherlands April 21, 1955

13 Claims. (Cl. 148—33)

The invention relates to semi-conductor devices, more particularly transistors or crystal diodes, in which at least two semi-conductive parts of different conductivity types are joined to one another and thus produce a barrier layer. Such a device may, for example, be manufactured by growing a single crystal from a melt, in which process, by variation of the impurities in the melt and/or by variation of the growing rate, parts of different conductivity type are produced, or by alloying a metal having donor or acceptor properties to a semi-conductive crystal, in which latter case part of the semi-conductive material is dissolved in the metal and, on cooling, regrows on the original crystal lattice with, however, a certain content of impurities, so that the grown part is given a conductivity type which differs from that of the crystal; or alternatively by diffusion or electro-chemical methods.

The barrier layer produced between such parts may have to satisfy different requirements, one or a number of which may be emphasized according to the use and the further structure of the device. A frequent requirement is that, when a voltage in the blocking direction is applied across the barrier layer, the resulting current is very small and/or the break-down voltage is high. In addition, it is frequently required that the capacitance between the parts on either side of the barrier layer be small. If one of the parts is to act as the emitter in a transistor, a high emitter efficiency may be aimed at. Improvement of the barrier layer in one respect frequently results in a deterioration in the other respect. Thus, a method of reducing the leakage current is known which involves the use of semi-conductive material of comparatively low resistivity. However, as a result of this measure, the capacitance is increased whereas the break-down voltage is decreased.

The capacitance of an emitter can be reduced by manufacturing the emitter of a material of high resistivity. However, in this case the emitter efficiency is reduced, that is to say, the ratio of the current injected by the emitter into the base, which current is carried by minority carriers in the base, to the total current which flows through the barrier layer of the emitter.

It has already been proposed to reduce the capacitance between the base and the collector in transistors by the interposition of a layer of intrinsically conductive material. This requires the use of a comparatively high collector voltage for rapidly sweeping the minority carriers injected into the base through the intrinsic layer and in order to prevent that the transit time of said carriers adversely affects the usability of the transistor at high frequencies.

It is an object of the invention to provide a reduction of the leakage current and of the capacitance and an increase of the break-down voltage or an increase of the emitter efficiency in a manner such that the above-mentioned disadvantages do not occur. It is based on recognition of the fact that the capacitance between parts of different conductivity types is materially determined by the nature of the material at the point of transition from one conductivity type to the other, while the current of the minority carriers passing through this transition is substantially determined by the nature of the material which is more remote, that is to say within a distance equal to several times the diffusion length of the minority carriers.

According to the invention, one of the two said parts comprises a layer or portion, hereinafter referred to as the buffer layer or portion, having a thickness which is at least twice the Debye-Hückel length but which is small compared with the diffusion length in this layer, while on the side of the buffer layer more remote from the barrier layer provision is made of a semi-conductive part, hereinafter referred to as the reflector, which extends to a distance from the barrier layer which is at least three times the thickness of the buffer layer, the resistivity of the reflector being low compared with that of the buffer layer.

The term "Debye-Hückel length" is to be understood to mean a length which depends upon the material of the buffer layer, as follows:

$$L_{DH}=\sqrt{\frac{\epsilon_r\epsilon_o kT}{q^2C}}$$

where $\epsilon_r$ is the relative dielectric constant in the buffer layer, $\epsilon_0$ the dielectric constant of vacuum in the Giorgi system, $k$ Boltzmann's constant, T the absolute temperature, $q$ the charge of the electron and C the sum total of the equilibrium concentrations of the majority and minority carriers in the buffer layer.

In order to explain the significance of this feature it may be remarked here that the thickness $x$ of the space charge or depletion area which is responsible for the capacitance of the blocking layer is in case of an abrupt or step junction:

$$x=\sqrt{\frac{2\epsilon_r\epsilon_o(V+V_d)}{qC}}=L_{DH}\sqrt{\frac{2q(V+V_d)}{kT}}\approx 9L_{DH}\sqrt{V+V_d}$$

The latter value applies at room temperature. In this formula, V represents the voltage applied in the blocking direction and $V_d$ the diffusion voltage. Since it is desirable that the space charge area is entirely situated in the buffer layer, the buffer layer should be made thicker according as the voltage $V+V_d$ is higher. At the emitter side of a transistor, V is negative and small and the same applies to $V_d$, so that at this side the space charge area is very thin and consequently the buffer layer may be very thin also.

Although some effect is already obtained as soon as the buffer layer is thinner than a diffusion length in the material of this layer, preferably the buffer layer is not made thicker than is required, for example, in view of the technical methods used in manufacturing or with a view to the provision of a contact. The expression: "the thickness of the buffer layer is small compared with the diffusion length" is to be understood to mean that the layer should not be thicker than one half of said length. Preferably, the thickness of the layer is not more than one third of said length but not less than twice the Debye-Hückel length or so much more as is required in view of the voltage V to be applied.

Some effect is also produced even when the resistivity of the reflector is slightly below that of the buffer layer; preferably the ratio of the resistivity of the buffer, to that of the reflector, however, exceeds three.

The conductivity type of the reflector is not of importance for reaching the required effect, and said type may be the same as that of the buffer layer or it may be different therefrom. However, the equality or inequality of the said conductivity types is of importance with respect to the provision of a current supply lead. When the reflector is of the same conductivity type as the buffer layer, a current supply lead may be secured to either of the two parts by means of an ohmic contact, if, however, the two conductivity types are different, the current supply lead must be connected to the buffer layer by means of an ohmic contact.

In order that the invention may readily be put into effect, a few effects which are of importance for the invention and two embodiments, given by way of example, will now be described.

Figure 1:
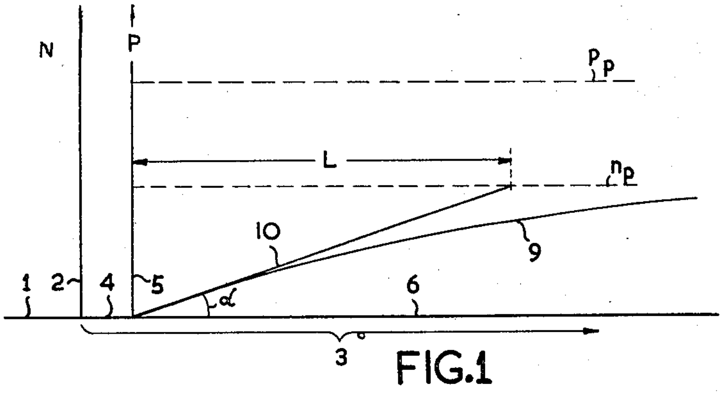
Figs. 1 to 4 are diagrams, which show among other things, the concentrations of the carriers in the buffer layer and the reflector.

Fig. 1 relates to the general case, that is to say without the use of the invention, where a semi-conductive part or zone 1 of n-type conductivity and of comparatively low-resistivity at a line or junction 2 passes into a semi-conductive part or zone 3 of p-type having a comparatively high resistivity, in order to reduce the capacitance between the two parts. Thus, a space charge or depletion area 4 is produced which extends to a line 5. The depth to which this area penetrates into the part 1 of the n-type, as a result of the larger number of carriers in said area, is considerably less so that this depth is negligible.

The equilibrium concentration $P_p$ of the majority carriers, that is to say of the holes, in the space charge free area 6 of the part 3, which area extends to the right-hand side of the line 5, is comparatively low due to the high resistivity. This concentration is shown diagrammatically and not to scale in the direction of the ordinates by the broken line $p_p$. This concentration may be, say, $3\times10^{14}/\text{cm.}^3$ The equilibrium concentration $n_p$ of the minority carriers, that is to say of the electrons, in this area is comparatively large, although, in absolute, sense, it is obviously much less than the concentration of the holes. It may be, say $3\times10^{12}/\text{cm.}^3$ and is shown by the broken line $n_p$.

If, now, a voltage is applied between the parts 1 and 3 in the blocking or reverse direction, that is to say so that the part 1 is positive with respect to the part 3, the electrons are pulled from the part 3 so that their concentration, according to the distance from the barrier layer and supposing the voltage V to be large with respect to the value $kT/q$, can be represented by the line 9. At room temperature, the said value is $\frac{1}{40}$ volt. The magnitude of the electron current in the vicinity of the line 5 is proportional at any point to the tangent of the angle between the line tangent to such a point and the abscissa. At the boundary 5 of the space charge area 4, this is the tangent 10, and the current is proportional to tan $\alpha$. The tangent of this angle is also equal to the quotient of the equilibrium concentration of the minority carriers divided by their diffusion length. The latter is shown in the figure by the distance L. It will be seen from the figure that the leakage current $i_1$ increases with increase in the concentration of the minority carriers. Consequently it may be written $$i_1=A\tan\alpha=A\frac{n_p}{L}$$

where A is a constant.

Figure 2:
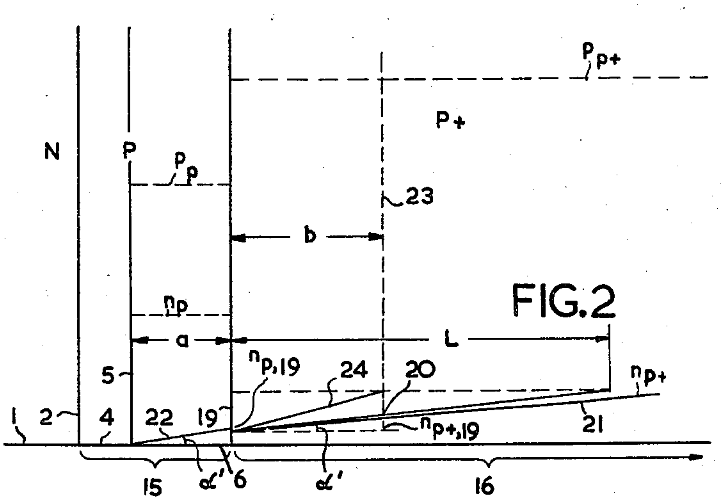

Fig. 2 relates to the case where the part 1 of n-type is joined to a thin buffer layer 15 of p-type, the resistivity of which is the same as that of the part 3 of Figure 1. Here also a space charge area 4 is found which extends to the line 5; in the space-charge-free area 6 the equilibrium concentrations of the holes and the electrons are shown in sequence, diagrammatically and not to scale, by the broken lines $p_p$ and $n_p$. At the side of the buffer layer 15 more remote from the barrier layer or junction 2, provision is made of a semi-conductive part 16 of p-type, the so-called reflector, which has a resistivity which is considerably lower than that of the buffer layer, as is shown by the letter P+. The equilibrium concentration $p_{p+}$ of the holes at this point is comparatively high and shown not to scale, by the broken line $p_{p+}$. It may be, say, $10^{16}/\text{cm.}^3$ The equilibrium concentration of the electrons is correspondingly low, say, $10^{11}/\text{cm.}^3$, and is designated by the broken line $n_{p+}$. The boundary between the buffer layer 5 and the reflector 16 is represented by the line 19. In the proximity of the boundary 19 another space charge area is produced, but this is thinner than the layer 4 and will be neglected hereinafter.

It is now assumed that the part 1 is again made positive with respect to the buffer layer 15. This may be effected by means of ohmic contacts provided on these parts 1 and 15, no contact being made with the reflector which consequently is as it were floating.

Hence, across the boundary 19 between the buffer layer and the reflector equal numbers of holes and electrons will flow in the same direction. The magnitude of these currents is determined by that of the minority carriers from the reflector and this is given by the tangent of the angle $\alpha$. This is the angle between the abscissa and the tangent 20 to the curve 21, which denotes the concentration of the electrons in the reflector. Here also field influences are neglected while it is assumed that the diffusion length in the reflector is again equal to L.

In the buffer layer 15, the concentration of the electrons is indicated by a curve 22. The tangent to this curve at the point of the boundary 19 must be parallel to the tangent 20, since the electron current is continuous. Since, furthermore, the buffer layer is very thin and its contribution to the electron current is negligible in spite of the higher concentration, the tangent to the curve 22 at the point 5 at which the space charge area ends will be approximately parallel to the tangent 20. The leakage current across the barrier layer 2 is consequently determined approximately by the value of the tangent of the angle $\alpha'$.

$$i'_1=A\text{ tg }\alpha'$$

The leakage current at the point of the line 5 can be expressed by $$i'_1=A\frac{n_{p,19}-n_{p,5}}{a}$$

where $n_{p,19}$ represents the concentration of the electrons in the buffer layer in the proximity of the line 19 and $n_{p,5}$ the concentration in the proximity of the line 5; $a$ is the thickness of the space-charge-free portion of the buffer layer and A is a constant.

With respect to $n_{p,5}$:

$$n_{p,5}=n_pe^{\frac{qV}{kT}}$$

and, since the barrier layer is loaded in the blocking direction, V is negative and $n_{p,5}$ is approximately equal to zero. Due to the continuity requirement, the same electron current flows in to the reflector at the point 19, which current can be expressed by $$i'_1=A\frac{n_{p+}-n_{p+,19}}{L}$$

assuming the reflector to have a thickness which is large compared with the diffusion length. The equilibrium concentration of the electrons in the p+ part, the reflector, is represented by $n_{p+}$.

In addition the following relation holds approximatively:

$$\frac{n_{p,19}}{n_p}=\frac{n_{p+,19}}{n_p}$$

from these three equations it follows:

$$i'_1=A\frac{n_p}{a+L\frac{n_p}{n_{p+}}}$$

It has already been mentioned that the thickness $a$ of the buffer layer is small compared with the diffusion length L, and since, in addition, $n_p$ considerably exceeds $n_{p+}$, which value is shown excessively large in the figure for the sake of clarity, $$i'_1=A\frac{n_{p+}}{L}$$

this value consequently is smaller by a factor $$\frac{n_p}{n_{p+}}$$

than in the case shown in Fig. 1 without the use of a reflector.

When the thickness of the reflector is less than L, for example is equal to $b$, as is shown by the broken line 23, the equilibrium concentration $n_{p+}$ of the minority carriers will be produced in case of very high surface recombination at this boundary 23, while the curve 21 becomes a straight line 24, so that in the most unfavourable event:

$$i'_1=A\frac{n_{p+}-n_{p+,19}}{b}\approx A\frac{n_{p+}}{b}$$

assuming that $$b\frac{n_p}{n_{p+}}>a$$

Consequently, in this case also an improvement is obtained upon the case described with reference to Fig. 1 provided that $$b\frac{n_p}{n_{p+}}>L$$

If an ohmic contact were provided at the reflector 16 instead of at the buffer layer 15, the above argument holds good nevertheless. In this latter case, the reflector has a negative potential with respect to the buffer layer; however, said potential cannot increase the electron current passing the boundary 19, since this current is now also determined by tan $\alpha'$.

Figure 3:
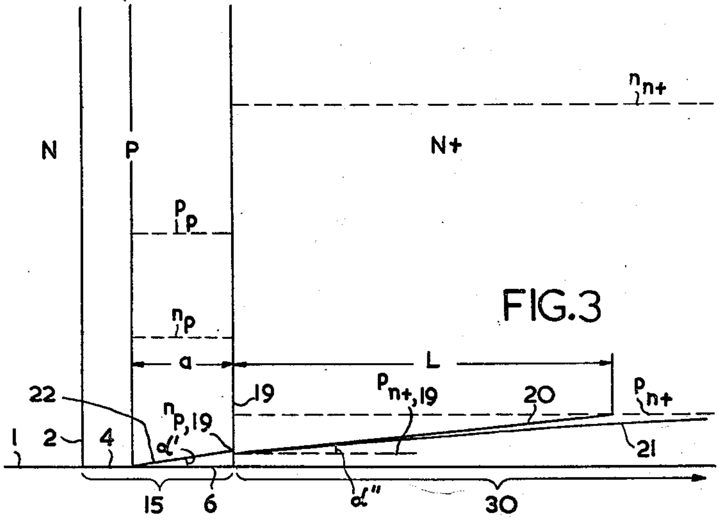

As has been mentioned hereinbefore, it is not necessary for the reflector to be of the same conductivity type as the buffer layer. In Fig. 3 it is assumed that the buffer layer is again of p-type and is provided with a reflector 30 of the n-type having comparatively low resistivity. The concentrations $n_{n+}$ and $p_{n+}$ of the electrons and the holes are shown successively by the broken lines $n_{n+}$ and $p_{n+}$. In this case also, the currents of electrons and holes across the boundary 19 are again equal to one another. The magnitude of said currents, in this case also, is determined by that of the minority carriers, in the present case of the holes. The concentration of the holes can be represented by the same curve 21 as is shown in Fig. 2. The magnitude of the hole current at the boundary 19 is proportional to tan $\alpha''$, and the electron current is equal in magnitude; consequently in the buffer layer the concentration of the electrons is again represented by the curve 22, while the leakage current is again determined by the value of the angle $\alpha'$. It should be noted that tan $\alpha'$ is not equal to tan $\alpha''$; the ratio of these values is equal to that of the mobilities of minority carriers.

However, in this case the ohmic connection must be made to the buffer layer and not to the reflector, since, if the connection were made to the reflector layer, the reflector would be given a negative potential with respect to the buffer layer so that the hole current is no longer determined by tan $\alpha''$ but by the number of holes which would be drawn from the buffer layer by the field.

The combination of a buffer layer and a reflector permits of the production of a semi-conductor device having a barrier layer, which device combines a low capacitance and a high breakdown-voltage with a small leakage current, because according to the invention a comparatively high-ohmic buffer layer is applied to decrease the capacitance and to increase the breakdown-voltage, without increasing the leakage current, which can be kept small by the use of a reflector.

When the voltage across the barrier layer is applied in the forward direction, it may be also of advantage to produce a low capacitance across the barrier layer or junction. As an example we may mention the emitter of a transistor. Assuming the resistivity of the base to be comparatively low, this might be achieved by manufacturing the emitter from a material of high resistivity. However, in this event the concentration of the minority carriers in the emitter is high and consequently the current consisting of these carriers which flows across the barrier layer between the emitter and the base is also large. This current is of no use for the transistor action. By the use of an emitter comprising a buffer layer and a reflector, said loss current can be substantially suppressed while retaining the low capacitance.

Figure 4:
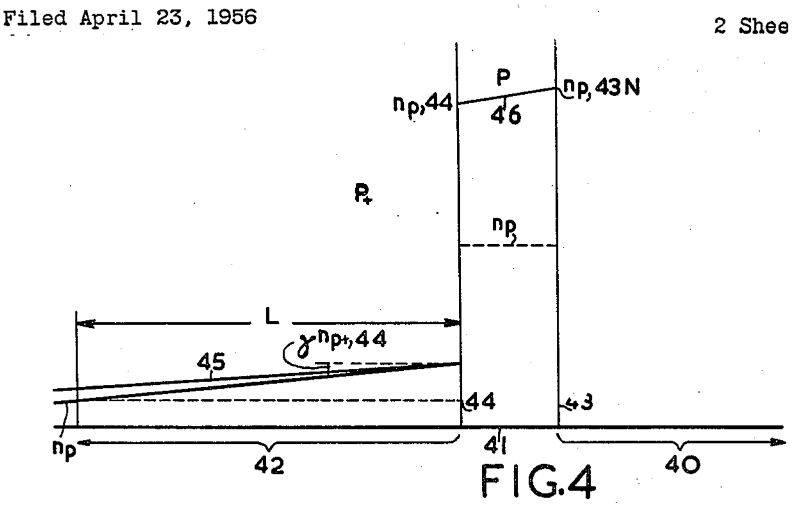

This case will be described more fully with reference to Fig. 4.

It is assumed that a base region 40 joins a buffer layer 41 which is provided with a reflector 42. The base 40 is made of n-type semi-conductive material, and the buffer layer and the reflector from p-type material, the resistivity of the first-mentioned material being comparatively high and that of the last-mentioned material comparatively low. The boundaries are indicated by the lines 43 and 44. The equilibrium concentrations of the minority carriers in the buffer layer and the reflector are again $n_p$ and $n_{p+}$. If, now, a voltage in the forward direction is applied, that is to say if the buffer layer is made positive with respect to the base, the concentration of the electrons at the barrier layer or junction 43 in the buffer layer is increased to a value $n_{p,43}$. From the continuity of the electron current across the boundary 44, the concentrations on both sides of the boundary 44 and consequently the current also can be calculated.

The concentration of the electrons in the reflector is now shown by a curve 45, the tangent at the point 44 being at an angle $\gamma$ to the abscissa. The concentration of the electrons in the buffer layer is shown by the curve 46.

$$i=A\ \text{tg}\ \gamma=\frac{n_{p+,44}-n_{p+}}{L}$$

here also the following relation holds approximately:

$$\frac{n_{p,44}}{n_p}=\frac{n_{p+,44}}{n_{p+}}$$

and in addition, $$i=A\frac{n_{p,43}-n_{p,44}}{a}$$

where $a$ is again the thickness of the buffer layer. In addition:

$$n_{p,43}=n_pe^{\frac{qV}{kT}}$$

here V is positive. From this it follows:

$$i=A\frac{n_p}{a+L\frac{n_p}{n_{p+}}}\cdot\left(e^{\frac{qV}{kT}}-1\right)$$

Consequently this is the electron current which flows across the barrier layer between the buffer layer 41 and the base 40.

It is again found that this current decreases as the ratio $$\frac{n_p}{n_{p+}}$$

increases. Here also the reflector may be thinner than the diffusion length L.

Finally two examples will be given of p-n-p transistors in order to illustrate some factors which are of importance for the invention.

Figure 5:
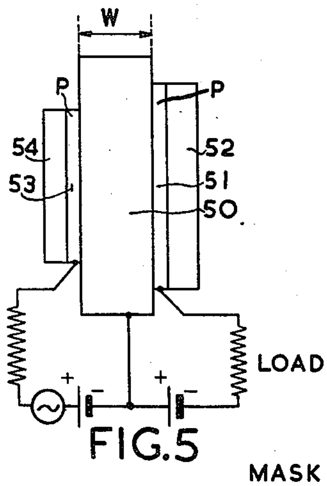
Fig. 5 shows a brief circuit for a transistor according to the invention.

Fig. 5 shows diagrammatically α transistor according to the invention, of which the base is designated 50, the collector buffer layer 51, the collector reflector 52, the emitter buffer layer 53 and the emitter reflector 54. Ohmic contacts are provided to the collector buffer layer, the emitter buffer layer and the base layer. A diagrammatic circuit for the transistor is also shown by way of example, with an input circuit connected between the emitter and base, and an output or load circuit connected between the collector and base.

Two cases will be considered in which the thickness $w$ of the base is assumed to be $10\mu$ and $3\mu$ respectively. It should be noted that it is very difficult to achieve the last-mentioned low value, but it is considered feasible in view of the development of the art of producing such thin base thicknesses and of the results obtained.

In addition, as a base material use is made of germanium having a comparatively low resistivity of 0.14 ohm-cm., while the resistivity of the buffer layer is assumed to be comparatively high, that is to say 16 ohm-cm. From this the Debye-Hückel length can be calculated:

$$L_{DH}=\sqrt{\frac{\epsilon_r\epsilon_o kT}{q^2C}}$$

where C is the concentration of the majority carriers which follows from the resistivity of the buffer layer material, since $$\frac{1}{\rho}=q.C\mu_p$$

where $\mu_p$ represents the mobility of the holes=1800 sq. cm./volt sec. Consequently, $C=2.2\times10^{+14}$. At room temperature $T=290$, $L_{DH}$ will be=$0.3\mu$.

The thickness $x$ of the space charge areas produced in the two buffer layers, one of which areas is designated by the reference numeral 4 in Figs. 1–3, follows from:

$$x=\sqrt{\frac{2\epsilon_r\epsilon_o(V+V_d)}{qC}}$$

and since $$qC=\frac{1}{\mu\rho}$$

$$\sqrt{2\epsilon_o\epsilon_r\mu}\cdot\sqrt{(V+V_d)\rho}=7.10^{-15}\sqrt{(V+V_d)\rho}\text{ cms.}$$

Assuming $(V+V_d)$ at the collector side to be=4 volts, the thickness of the space charge area at this point is:

$$x_c=7.10^{-5}\sqrt{4.16}=5.6\mu$$

At the emitter side the diffusion voltage and the control or input signal voltage must be considered. Assuming the first to be ¼ volt and the second to be ⅛ volt, then $$x_e=7.10^{-5}\sqrt{\tfrac{1}{8}.16}=1\mu$$

In order to ensure that the space charge area at the collector side is entirely incorporated in the buffer layer, the latter must in this case have a thickness which is about 20 times the Debye-Hückel length, i. e. about 6 microns while at the emitter side a thickness equal to 4 times said length would be sufficient.

The cut-off frequency $f_{c\alpha}$ is calculated in mc./s. from $$f_{c\alpha}=\frac{D}{\pi w^2}\cdot10^{-6}$$

where D is the diffusion constant which is assumed to be 40 sq. cms./sec.

The base resistance $r_b$ in Ω is calculated from $$r_b=\frac{\rho\omega}{8\pi w}$$

where $\rho_\omega$ is the base resistivity.

The diameters $d_e$ and $d_c$ of the emitter and the collector are assumed to be 0.250 and 0.375 mm. respectively. Since the thickness of the space charge layers $x_e$ and $x_c$ are known, the emitter and collector capacitances can also be calculated:

$$C=\frac{O.\epsilon_o\epsilon_r}{x}$$

where O is the surface area of the emitter and collector respectively.

Finally the figure of merit M is calculated by means of the formula:

$$M=\sqrt{\frac{f_{c\alpha}}{25r_bC_c}}\text{ mc./sec.}$$

The results are listed in the following table.

| | | |
|---|---|---|
| Base thickness W in $\mu$ | 10 | 3 |
| Resistivity of the base $\rho_\omega$ in ohm-cm | 0.14 | 0.14 |
| Resistivity of the buffer layer $\rho_b$ in ohm-cm | 16 | 16 |
| $L_{DH}$ in $\mu$ | 0.31 | 0.31 |
| $x_c$ in $\mu$ | 5.6 | 5.6 |
| $x_e$ in $\mu$ | 1 | 1 |
| $f_{c\alpha}$ in mc./s | 13 | 140 |
| $r_b$ in Ω | 6 | 18 |
| $d_e$ in mm | 0.250 | 0.250 |
| $d_c$ in mm | 0.375 | 0.375 |
| $C_c$ in pf | 2.5 | 2.5 |
| $C_e$ in pf | 7 | 7 |
| M in mc./s | 190 | 350 |

Neither the thickness nor the resistivity of the reflectors is given in the table. The considerations made with reference to Figs. 1 to 4 show that the resistivity must be low, for example $\frac{1}{10}$ of that of the buffer layer. The thickness preferably exceeds the diffusion L although a thinner layer also provides an improvement.

With such a transistor, of which the collector consists of a buffer and reflector, having resistivities respectively of 16 ohm-cm. and 1.6 ohm-cm., a decrease of the collector capacitance of about 3 times and a much greater increase in breakdown voltage are obtained as compared with a transistor which has the same base resistivity and a collector resistivity of 1.6 ohm-cm., the leakage current in both cases having about the same low value. When however the reflector is given a much lower resistivity than the base-resistivity (in our example 0.14 ohm-cm.), and the buffer layer has again a resistivity of 16 ohm-cm., a decrease of the collector capacitance of about 7 times, and a still much greater increase of breakdown voltage are obtained as compared with a prior art transistor, which has a base resistivity of 0.14 ohm-cm. and a collector resistivity equal to the resistivity of the reflector, the leakage current in both cases having about the same low value.

When the buffer layer is made too thick at the emitter side, the so-called storage capacity will become unduly high, which is produced by the fact that the concentration of the carriers varies in each period of the current so that an apparent capacitance effect occurs. Therefore the thickness of this buffer layer should not exceed that of the base.

Although in the above the operation of a buffer layer and a reflector was described with reference to a transistor, it will be obvious, as will be seen from Figs. 1 to 4, that this combination can be used with equal effect in a rectifier or diode or photo-electric cell.

In manufacturing the electrode system according to the invention, generally use may be made of semi-conductive materials in which zones of opposite conductivity type and different conductivity can be produced, for example germanium, silicon, and the compound semi-conductors, which consist of an element of the III group and an element of the V group of the periodic table, as for example and GaAs.

The known techniques of introducing impurity atoms into the crystal lattice can be used for establishing in the semi-conductive body zones of different conductivity and/or opposite conductivity type, for example crystal-pulling or zone-melting, or by introducing into the melt of the semi-conductor certain quantities of impurity atoms, or by diffusion, or alloying, or a combination of these methods.

By introducing into germanium and silicon acceptors, for example indium, gallium, aluminum, excess holes are created in the lattice, which may give rise to hole conduction, whereas the introduction of donors, for example bismuth, arsenic, antimony may give rise to excess electrons. In the socalled III–V compounds hole and electron conduction may for example be obtained by introducing into the lattice elements of the II and VI groups, respectively, of the periodic table. Another method consists of introducing deviations of the stoichiometric composition into the lattice, for example cation vacancies may give p-type conduction, and anion vacancies may lead to n-type conduction.

A method of manufacturing a transistor according to the invention will now be described by way of example.

Figure 6:
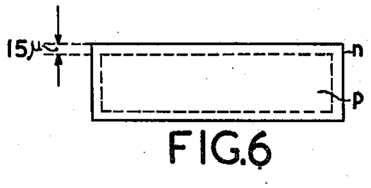
Figs. 6 to 10 illustrate schematically the successive phases of a manufacturing process of a transistor according to the invention.
Figure 7:
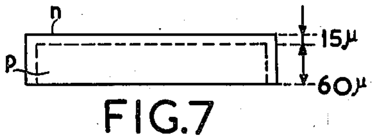
Figure 8:
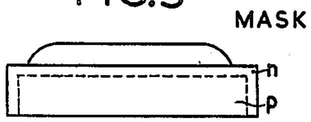
Figure 9:
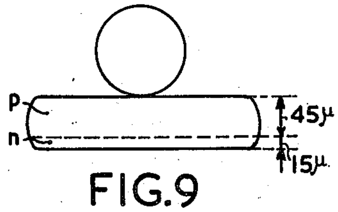

A cylindrical p-type germanium wafer, having a resistivity of 16 ohm-cm. and a diameter of about one millimeter and a thickness of 200$\mu$, is surrounded in a crucible on all sides by a powder consisting of 96% by weight of $SiO_2$ and 4% by weight of $As_2O_3$ and subsequently heated at a temperature of 600° C. for 4 hours. The powder is then removed and the wafer is afterheated for 4 hours at a temperature of 800° C. After this treatment the configuration of Figure 6 is obtained; the wafer is surrounded on all sides by a thin n-type layer about 15 microns thick, produced by diffused arsenic, of which the resistivity at the surface is about 0.05 ohm-cm. The wafer is then ground on one side to a thickness of 75$\mu$ in such a manner that the configuration of Fig. 7 is produced. The n-type layer of the semi-conductive body is partly masked with polystyrene (Fig. 8), and subsequently the assembly is etched in a bath consisting of equal parts $HNO_3$ and HF, in such a manner that a layer of about 15 microns is etched away. After removing the mask, a wafer, 60$\mu$ thick, consisting of a n-type layer 15$\mu$ thick and a p-type layer 45$\mu$ thick has been obtained. On the p-type layer an indium dot is placed of 400$\mu$ diameter (Fig. 9), and the assembly is subsequently heated for about 10 minutes at a temperature of 600° C. in a non-oxidizing atmosphere. The alloy electrode thus resulting penetrates about 35$\mu$ into the wafer, and during cooling a low ohmic p-type layer of 20$\mu$ is produced by segregation. An emitter and base-contact are alloyed by heating on the n-type layer, with the former comprising an InGa dot, consisting of 96% by weight of indium and 4% by weight of gallium, and the latter an InSb dot, consisting of 95% by weight of indium and 5% by weight of antimony, for about 5 minutes at 400° C. in a non-oxidising atmosphere.

Figure 10:
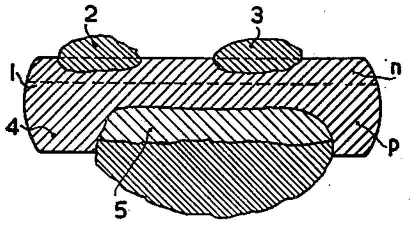

After this treatment, the assembly is given a slight etch and a transistor has been obtained according to Fig. 10. The n-type layer constitutes the base 1, on which are situated the base contact 2 and the emitter 3. The collector consists of a high-ohmic part, the buffer layer 4, about 10$\mu$ thick, and a comparatively low ohmic part, the reflector 5, about 20$\mu$ thick.

The above method of manufacturing a transistor according to the invention has been described as a specific example and method of execution, which however will suggest other obvious modifications to those skilled in the art without departing from the spirit and scope of the invention.

What is claimed is:

1. A semi-conductor device comprising a semi-conductive body containing a p-n junction, a buffer portion of the semi-conductive body on one side of said junction and having a thickness at least twice the Debye-Hückel length $L_{DH}$ but small relative to a diffusion length L in said buffer portion, where $$L_{DH}=\sqrt{\frac{\epsilon_r \epsilon_o kT}{q^2 C}}$$

and $\epsilon_r$ and $\epsilon_0$ are the dielectric constants, respectively, of the buffer portion and vacuum in the Giorgi system, $k$ is Boltzmann's constant, T is the absolute temperature, $q$ is the charge of the electron, and C is the sum total of the equilibrium concentrations of the majority and minority carriers in the semi-conductive buffer portion, a reflector portion of the semi-conductive body adjacent the buffer portion on the side thereof remote from the said junction and having a length such that the remotest portion thereof is spaced from the said junction a distance at least three times the thickness of the buffer portion, the resistivity of the reflector portion being lower than the resistivity of the buffer portion, the buffer and reflector portions on said one side of the junction being both of the same conductivity type of semi-conductive material, and ohmic connections to a portion of the body on the other side of the junction and to the buffer portion.

2. A semi-conductor device comprising a semi-conductive body containing a p-n junction, a buffer portion of the semi-conductive body on one side of the junction and having a thickness at least twice the Debye-Hückel length $L_{DH}$ but small relative to a diffusion length L in said buffer portion, where $$L_{DH}=\sqrt{\frac{\epsilon_r \epsilon_o kT}{q^2 C}}$$

and $\epsilon_r$ and $\epsilon_0$ are the dielectric constants, respectively, of the buffer portion and vacuum in the Giorgi system, $k$ is Boltzmann's constant, T is the absolute temperature, $q$ is the charge of the electron, and C is the sum total of the equilibrium concentrations of the majority and minority carriers in the buffer portion, a reflector portion of the semi-conductive body adjacent the buffer portion on the side thereof remote from the said junction and having a thickness such that the remotest portion thereof is spaced from the said junction a distance at least three times the thickness of the buffer portion, the resistivity of the reflector portion being lower than the resistivity of the buffer portion, said buffer and reflector portions being of opposite conductivity types of semi-conductive material, and ohmic connections to a portion of the body on the other side of the said junction and to the buffer portion, said reflector portion being floating.

3. A semi-conductor device of the transistor type comprising a semi-conductive body including a base portion, emitter and collector portions forming p-n junctions with said base portion, said emitter and collector portions each comprising a buffer portion of the semi-conductive body adjacent the junction and having a thickness at least twice the Debye-Hückel length $L_{DH}$ but small relative to a diffusion length L in said buffer portion, where $$L_{DH}=\sqrt{\frac{\epsilon_r \epsilon_o kT}{q^2 C}}$$

and $\epsilon_r$ and $\epsilon_0$ are the dielectric constants, respectively, of the buffer portion and vacuum in the Giorgi system, $k$ is Boltzmann's constant, T is the absolute temperature, $q$ is the charge of the electron, and C is the sum total of the equilibrium concentrations of the majority and minority carriers in the buffer portion, a reflector portion of the semi-conductive body adjacent each buffer portion on the side thereof remote from the said junction and having a length such that the remotest portion thereof is spaced from the said junction a distance at least three times the thickness of the buffer portion, the resistivity of the reflector portions of the emitter and collector portions being lower than the resistivity of the buffer portions, and ohmic connections to the base portion and the emitter and collector buffer portions, the emitter and collector reflector portions being floating.

4. A semi-conductor device comprising a semi-conductive body containing a barrier layer, a buffer portion of the semi-conductive body on one side of the barrier layer and having a thickness at least twice the Debye- Hückel length $L_{DH}$ but small relative to a diffusion length L in said buffer portion, where $$L_{DH}=\sqrt{\frac{\epsilon_r\epsilon_o kT}{q^2C}}$$

and $\epsilon_r$ and $\epsilon_0$ are the dielectric constants, respectively, of the buffer portion and vacuum in the Giorgi system, $k$ is Boltzmann's constant, T is the absolute temperature, $q$ is the charge of the electron, and C is the sum total of the equilibrium concentrations of the majority and minority carriers in the buffer portion, a reflector portion of the semi-conductive body adjacent the buffer portion on the side thereof remote from the said barrier layer and having a thickness such that the remotest portion thereof is spaced from the said barrier layer a distance at least three times the thickness of the buffer portion, the resistivity of the reflector portion being lower than the resistivity of the buffer portion, said buffer and reflector portions being of the same conductivity type of semi-conductive material, and connections to portions of the body on opposite sides of said barrier layer.

5. A semi-conductor device comprising a semi-conductive body containing a barrier layer, a buffer portion of the semi-conductive body on one side of the barrier layer and having a thickness at least twice the Debye-Hückel length $L_{DH}$ but small relative to a diffusion length L in said buffer portion, where $$L_{DH}=\sqrt{\frac{\epsilon_r\epsilon_o kT}{q^2C}}$$

and $\epsilon_r$ and $\epsilon_0$ are the dielectric constants, respectively, of the buffer portion and vacuum in the Giorgi system, $k$ is Boltzmann's constant, T is the absolute temperature, $q$ is the charge of the electron, and C is the sum total of the equilibrium concentrations of the majority and minority carriers in the buffer portion, a reflector portion of the semi-conductive body adjacent the buffer portion on the side thereof remote from the said barrier layer and having a thickness such that the remotest portion thereof is spaced from the said barrier layer a distance at least three times the thickness of the buffer portion, the resistivity of the reflector portion being lower than the resistivity of the buffer portion, said buffer and reflector portions being of opposite conductivity types of semi-conductive material, and connections to a portion of the body on the other side of said barrier layer and to the buffer portion, said reflector portion being floating.

6. A semi-conductor device comprising a semi-conductive body containing a p-n junction, a buffer region of the semi-conductive body on one side of the junction and having a thickness at least twice the Debye-Hückel length $L_{DH}$ but less than one-third of a diffusion length L in said buffer region, where $$L_{DH}=\sqrt{\frac{\epsilon_r\epsilon_o kT}{q^2C}}$$

and $\epsilon_r$ and $\epsilon_0$ are the dielectric constants, respectively, of the buffer region and vacuum in the Giorgi system, $k$ is Boltzmann's constant, T is the absolute temperature, q is the charge of the electron, and C is the sum total of the equilibrium concentrations of the majority and minority carriers in the buffer region, a reflector region of the semi-conductive body adjacent the buffer region on the side thereof remote from the said junction and having a thickness such that the remotest portion thereof is spaced from the said junction a distance at least three times the thickness of the buffer region, the resistivity of the buffer region being greater than three times the resistivity of the reflector region and being greater than the resistivity of the region of the body on the other side of the junction, and connections to the said region of the body on the other side of said junction and to one of the buffer and reflector regions.

7. A semi-conductor device of the transistor type comprising a semi-conductive body including a base portion, emitter and collector portions forming p-n junctions with said base portion, at least one of said emitter and collector portions comprising a buffer portion of the semi-conductive body adjacent the junction and having a thickness at least twice the Debye-Hückel length $L_{DH}$ but small relative to a diffusion length L in said buffer portion, where $$L_{DH}=\sqrt{\frac{\epsilon_r\epsilon_o kT}{q^2C}}$$

and $\epsilon_r$ and $\epsilon_0$ are the dielectric constants, respectively, of the buffer portion and vacuum in the Giorgi system, $k$ is Boltzmann's constant, T is the absolute temperature, $q$ is the charge of the electron, and C is the sum total of the equilibrium concentrations of the majority and minority carriers in the buffer portion, said one portion also including a reflector portion of the semi-conductive body adjacent the buffer portion on the side thereof remote from the said junction and having a length such that the remotest portion thereof is spaced from the said junction a distance at least three times the thickness of the buffer portion, the resistivity of the reflector portion being lower than the resistivity of the buffer portion, and ohmic connections to the base portion and the emitter and collector portions.

8. A device as set forth in claim 7 wherein the collector portion comprises the buffer and reflector portions.

9. A device as set forth in claim 7 wherein the emitter and collector portions each comprise buffer and reflector portions.

10. A device as set forth in claim 9 wherein the emitter buffer portion is thinner than the base portion.

11. A semi-conductor device of the junction transistor type comprising a semi-conductive body including a base portion, emitter and collector portions forming p-n junctions with said base portion, at least one of said emitter and collector portions comprising a buffer portion of the semi-conductive body adjacent the junction and having a thickness at least twice the Debye-Hückel length $L_{DH}$ but less than one-third a diffusion length L in said buffer portion, where $$L_{DH}=\sqrt{\frac{\epsilon_r\epsilon_o kT}{q^2C}}$$

and $\epsilon_r$ and $\epsilon_0$ are the dielectric constants, respectively, of the buffer portion and vacuum in the Giorgi system, $k$ is Boltzmann's constant, T is the absolute temperature, $q$ is the charge of the electron, and C is the sum total of the equilibrium concentrations of the majority and minority carriers in the buffer portion, said one portion also comprising a reflector portion of the semi-conductive body adjacent the buffer portion on the side thereof remote from the said junction and having a length such that the remotest portion thereof is spaced from the said junction a distance at least three times the thickness of the buffer portion, the resistivity of the buffer portion being greater than three times the resistivity of the reflector portion and being greater than the resistivity of the base portion, and ohmic connections to the base portion and the emitter and collector portions.

12. A device as set forth in claim 11 wherein the buffer and reflector portions are of the same conductivity type.

13. A device as set forth in claim 11 wherein the buffer and reflector portions are of opposite conductivity types, and the reflector portion is floating.

References Cited in the file of this patent

UNITED STATES PATENTS

| | | |
|---|---|---|
| 2,569,347 | Shockley | Sept. 25, 1951 |
| 2,623,105 | Shockley et al. | Dec. 23, 1952 |
| 2,697,052 | Dacey et al. | Dec. 14, 1954 |

U. S. DEPARTMENT OF COMMERCE

PATENT OFFICE

CERTIFICATE OF CORRECTION

Patent No. 2,822,310 February 4, 1958

Frederik Hendrik Stieltjes et al.

It is hereby certified that error appears in the printed specification of the above numbered patent requiring correction and that the said Letters Patent should read as corrected below.

Column 8, line 70, before "and" insert -- GaSb, --.

Signed and sealed this 15th day of April 1958.

(SEAL)
Attest:

KARL H. AXLINE
Attesting Officer

ROBERT C. WATSON
Commissioner of Patents